US012336945B2

(12) United States Patent
Childs et al.

(10) Patent No.: US 12,336,945 B2
(45) Date of Patent: Jun. 24, 2025

(54) SIDE RAIL ASSEMBLY FOR A PATIENT SUPPORT APPARATUS

(71) Applicant: Stryker Corporation, Kalamazoo, MI (US)

(72) Inventors: William D. Childs, Plainwell, MI (US); Christopher Ryan Sweeney, Portage, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/755,965

(22) Filed: Jun. 27, 2024

(65) Prior Publication Data

US 2024/0342029 A1 Oct. 17, 2024

Related U.S. Application Data

(63) Continuation of application No. 18/374,030, filed on Sep. 28, 2023, now Pat. No. 12,048,660, which is a (Continued)

(51) Int. Cl.
*A61G 7/05* (2006.01)

(52) U.S. Cl.
CPC ............ *A61G 7/052* (2016.11); *A61G 7/0509* (2016.11); *A61G 7/0516* (2016.11)

(58) Field of Classification Search
CPC .......... A61G 7/00; A61G 7/05; A61G 7/0507; A61G 7/052; A61G 7/0509; A61G 7/0516
See application file for complete search history.

(56) References Cited

U.S. PATENT DOCUMENTS 6,058,531 A 5/2000 Carroll
6,240,580 B1 * 6/2001 Hamilton ............ A61G 7/0524 5/425

(Continued)

FOREIGN PATENT DOCUMENTS

| | | |
|---|---|---|
| CA | 2520093 C | 6/2011 |
| CA | 2619678 C | 4/2013 |
| EP | 2322129 B1 | 12/2014 |

OTHER PUBLICATIONS

Stryker, "In-Touch Critical Care Bed, Model FL27, 2131/2141 Maintenance Manual," 2141-009-002 Rev A, https://techweb.stryker.com/Critical_Care/FL27/3_0/maintenance/2141-009-002A.pdf, Jun. 2012, 247 pages.

*Primary Examiner* — Fredrick C Conley
(74) *Attorney, Agent, or Firm* — Howard & Howard Attorneys PLLC

(57) ABSTRACT

A patient support apparatus includes a support structure having a patient support deck and a side rail coupled to the support structure. The side rail is movable relative to the support structure. A lock releasably locks the side rail in one or more side rail positions, such as in a raised position and an intermediate position. A manual release is coupled to the side rail and operable to unlock the side rail. A bypass lever is provided to allow a user to raise the side rail from a lowered position to the raised position without locking in the intermediate position. A damper is located inside the side rail to counterbalance the weight of the side rail and assist the user in raising the side rail, bi-directionally. The side rail is formed of first and second walls that are heat staked together to form a lightweight side rail of suitable strength.

20 Claims, 14 Drawing Sheets

Related U.S. Application Data continuation of application No. 18/120,502, filed on Mar. 13, 2023, now Pat. No. 11,806,294, which is a continuation of application No. 17/243,867, filed on Apr. 29, 2021, now Pat. No. 11,622,897.

(60) Provisional application No. 63/017,927, filed on Apr. 30, 2020.

(56) References Cited

U.S. PATENT DOCUMENTS

| | | | | |
|---|---|---|---|---|
| 7,690,059 | B2 | 4/2010 | Lemire et al. | |
| 7,708,346 | B2 | 5/2010 | White et al. | |
| 7,761,939 | B2 | 7/2010 | Wiggins et al. | |
| 7,784,125 | B2 | 8/2010 | Morin et al. | |
| 7,805,784 | B2 * | 10/2010 | Lemire | A61G 7/0506 108/147 |
| 8,104,118 | B2 | 1/2012 | Derenne et al. | |
| 8,631,524 | B2 | 1/2014 | Derenne et al. | |
| 10,507,151 | B2 | 12/2019 | Tessmer et al. | |
| 11,622,897 | B2 | 4/2023 | Childs et al. | |
| 11,806,294 | B2 | 11/2023 | Childs et al. | |
| 2005/0132935 | A1 | 6/2005 | Lahmann et al. | |
| 2006/0085912 | A1 | 4/2006 | Kuek et al. | |
| 2006/0168731 | A1 | 8/2006 | Menkedick et al. | |
| 2017/0020757 | A1 | 1/2017 | Tessmer et al. | |
| 2017/0172829 | A1 | 6/2017 | Tessmer et al. | |
| 2021/0338504 | A1 * | 11/2021 | Childs | A61G 7/0516 |
| 2023/0210705 | A1 | 7/2023 | Childs et al. | |
| 2024/0016681 | A1 | 1/2024 | Childs et al. | |

* cited by examiner

SIDE RAIL ASSEMBLY FOR A PATIENT SUPPORT APPARATUS

CROSS-REFERENCE TO RELATED APPLICATIONS

This application is a Continuation of U.S. patent application Ser. No. 18/374,030 filed on Sep. 28, 2023, which is a Continuation of U.S. patent application Ser. No. 18/120,502 filed on Mar. 13, 2023 and issued as U.S. Pat. No. 11,806,294 on Nov. 7, 2023, which is a Continuation of U.S. patent application Ser. No. 17/243,867 filed on Apr. 29, 2021 and issued as U.S. Pat. No. 11,622,897 on Apr. 11, 2023, which claims priority to and all the benefits of U.S. Provisional Patent Application No. 63/017,927 filed on Apr. 30, 2020, the disclosures of each of which are hereby incorporated by reference in their entirety.

BACKGROUND

Often, a patient support apparatus, such as a hospital bed, has one or more side rails that are movable between a raised position in which the side rail blocks egress of a patient from the patient support apparatus, a lowered position in which the patient is able to egress from the patient support apparatus, and an intermediate position between the raised position and the lowered position. Typically, a user manually raises or lowers the side rail. Due to their weight and bulk, repetitive raising and lowering of side rails, such as by caregivers, can be physically demanding.

DETAILED DESCRIPTION OF THE EMBODIMENTS

Figure 1:
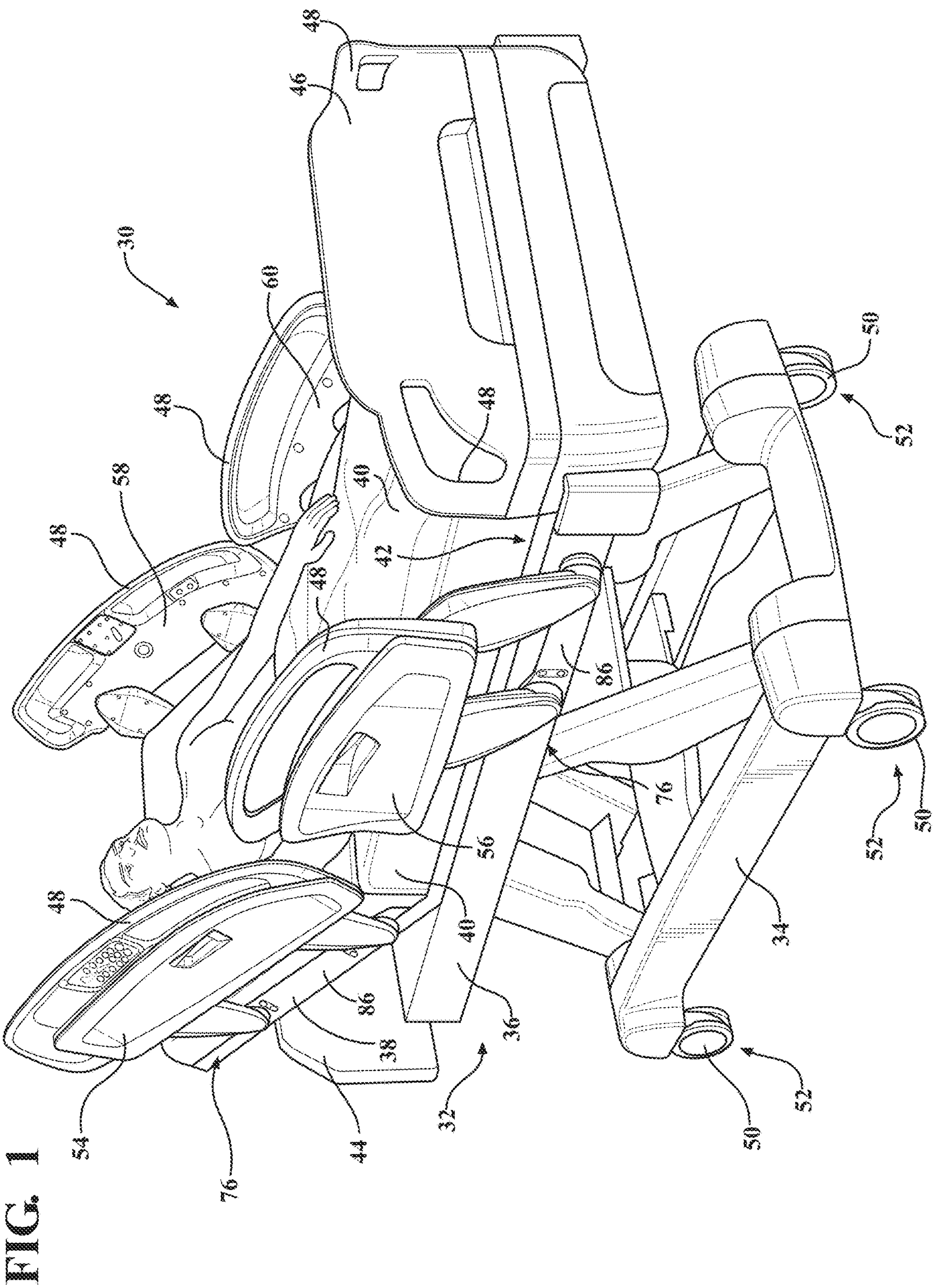
FIG. 1 is a perspective view of a patient support apparatus including a plurality of side rail assemblies.

Referring to FIG. 1, a patient support apparatus 30 is shown for supporting a patient in a health care setting. The patient support apparatus 30 illustrated in FIG. 1 is a hospital bed. In some embodiments, however, the patient support apparatus 30 may be a stretcher, cot, table, wheelchair, or similar apparatus utilized in the care of a patient.

A support structure 32 provides support for the patient. The support structure 32 illustrated in FIG. 1 includes a base 34 and an intermediate frame 36. The intermediate frame 36 is shown above the base 34. The support structure 32 also includes a patient support deck 38 disposed on the intermediate frame 36. The patient support deck 38 includes several sections, some of which articulate (e.g., pivot) relative to the intermediate frame 36, such as a fowler section, a seat section, a thigh section, and a foot section. The patient support deck 38 provides a patient support surface 42 upon which the patient is supported.

A mattress 40 is disposed on the patient support deck 38. The mattress 40 includes a secondary patient support surface upon which the patient is supported. The base 34, intermediate frame 36, patient support deck 38, and patient support surfaces 42 each have a head end and a foot end corresponding to designated placement of the patient's head and feet on the patient support apparatus 30. The construction of the support structure 32 may take on any known or conventional design, and is not limited to that specifically set forth above. In addition, the mattress 40 may be omitted in certain embodiments, such that the patient rests directly on the patient support surface 42.

A headboard 44 and a footboard 46 are coupled to the intermediate frame 36. In some embodiments, when the headboard 44 and footboard 46 are included, the headboard 44 and footboard 46 may be coupled to other locations on the patient support apparatus 30, such as the base 34. In still further embodiments, the patient support apparatus 30 does not include the headboard 44 and/or the footboard 46.

Caregiver interfaces 48, such as handles, are shown integrated into the footboard 46 to facilitate movement of the patient support apparatus 30 over floor surfaces. Additional caregiver interfaces 48 may be integrated into the headboard 44 and/or other components of the patient support apparatus 30. The caregiver interfaces 48 are graspable by the caregiver to manipulate the patient support apparatus 30 for movement.

Wheels 50 are coupled to the base 34 to facilitate transport over the floor surfaces. The wheels 50 are arranged in each of four quadrants of the base 34 adjacent to corners of the base 34. In the embodiment shown, the wheels 50 are caster wheels able to rotate and swivel relative to the support structure 32 during transport. Each of the wheels 50 forms part of a caster assembly 52. Each caster assembly 52 is mounted to the base 34. It should be understood that various configurations of the caster assemblies 52 are contemplated. In addition, in some embodiments, the wheels 50 are not caster wheels and may be non-steerable, steerable, non-powered, powered, or combinations thereof. Additional wheels are also contemplated. For example, the patient support apparatus 30 may include four non-powered, non-steerable wheels, along with one or more powered wheels. In some cases, the patient support apparatus 30 may not include any wheels.

Side rails 54, 56, 58, 60 are coupled to the support structure 32, such as by being coupled directly to the intermediate frame 36 and/or the patient support deck 38.

The side rails 54, 56, 58, 60 are thus indirectly supported by the base 34. A first side rail 54 is positioned at a right head end of the patient support apparatus 30. The first side rail 54 is coupled to the fowler section of the patient support deck 38. A second side rail 56 is positioned at a right foot end of patient support apparatus 30. The second side rail 56 is coupled to the intermediate frame 36. A third side rail 58 is positioned at a left head end of the patient support apparatus 30. The third side rail 58 is coupled to the fowler section of the patient support deck 38. A fourth side rail 60 is positioned at a left foot end of the patient support apparatus 30. The fourth side rail 60 is coupled to the intermediate frame 36.

It should be appreciated that the side rails 54, 56, 58, 60 may be mounted to other parts of the patient support apparatus 30. In some cases, all of the side rails 54, 56, 58, 60 are mounted to the intermediate frame 36. In other cases, all of the side rails 54, 56, 58, 60 are mounted to the patient support deck 38. If the patient support apparatus 30 is a stretcher or a cot, there may be fewer side rails.

For ease of description, reference hereinafter may be made to one side rail assembly, including the fourth side rail 60, with the understanding that the following description applies equally to any of the side rails 54, 56, 58, 60 and their associated assemblies. Furthermore, shapes and/or sizes of the side rails 54, 56, 58, 60 may vary depending on whether the side rail is a head end side rail or foot end side rail. In some cases, each of the side rails 54, 56, 58, 60 may have a different shape and/or size. In other cases, each of the side rails 54, 56, 58, 60 have the same shape and/or size. The side rails 54, 56, 58, 60 may be formed of metal, plastic, combinations thereof, and/or other suitable materials and may be formed by molding, casting, or other suitable methods. The side rails 54, 56, 58, 60 may be formed in one piece or in separate pieces connected together, as will be described further below.

Figure 2:
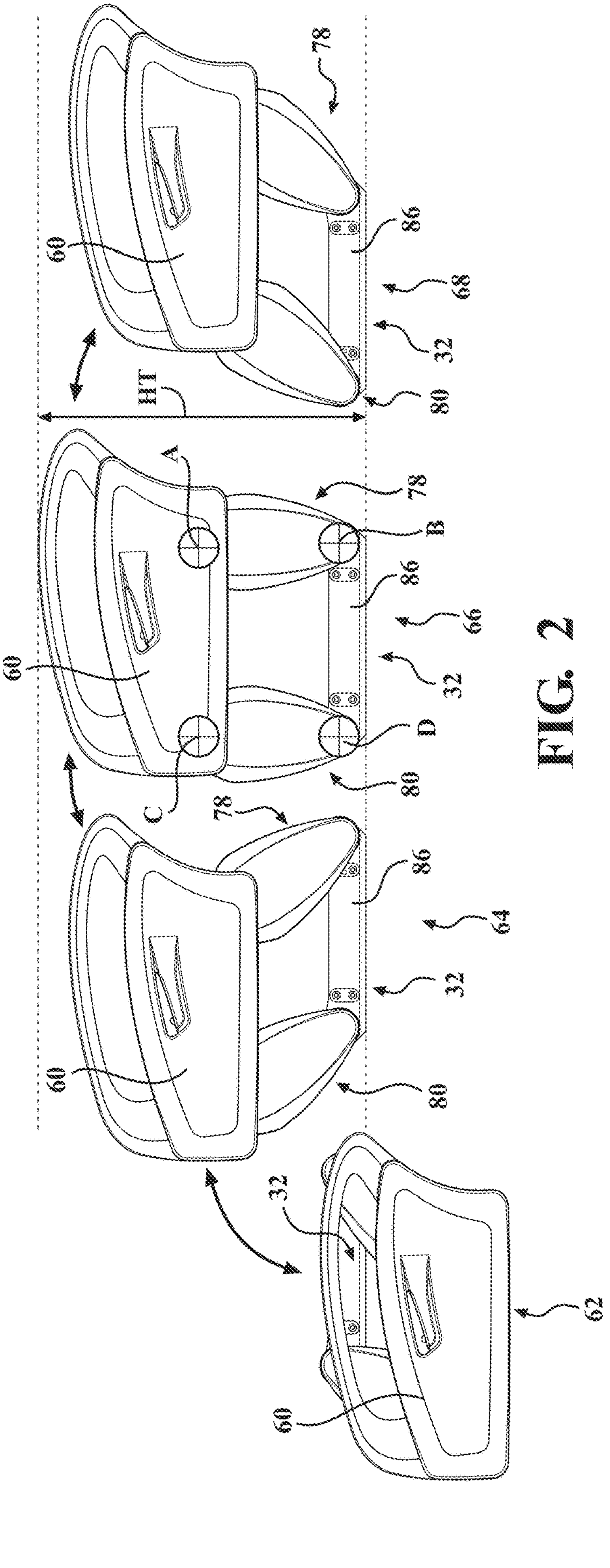
FIG. 2 is a front view illustrating transition of a side rail from a lowered position to a raised position.

As shown in FIG. 2, the side rail 60 is movable relative to the support structure 32 between a plurality of side rail positions. The side rail positions may include a lowered position 62, an intermediate position 64, a full-height position 66, a raised position 68, and various other positions in between. In some versions, the full-height position 66 is the highest position of the side rail 60 relative to the support structure 32, as represented by the height HT, and the lowered position 62 is the lowest position of the side rail 60 relative to the support structure 32. The side rail 60 may be movable to any position between, before, or beyond the positions shown in FIG. 2. In the embodiment shown in FIG. 2, the side rail 60 is arranged so that the side rail 60 is kept in the same orientation as the side rail 60 moves between the various positions. In some embodiments, the side rail 60 may change orientation when moving between the various positions.

Figure 3:
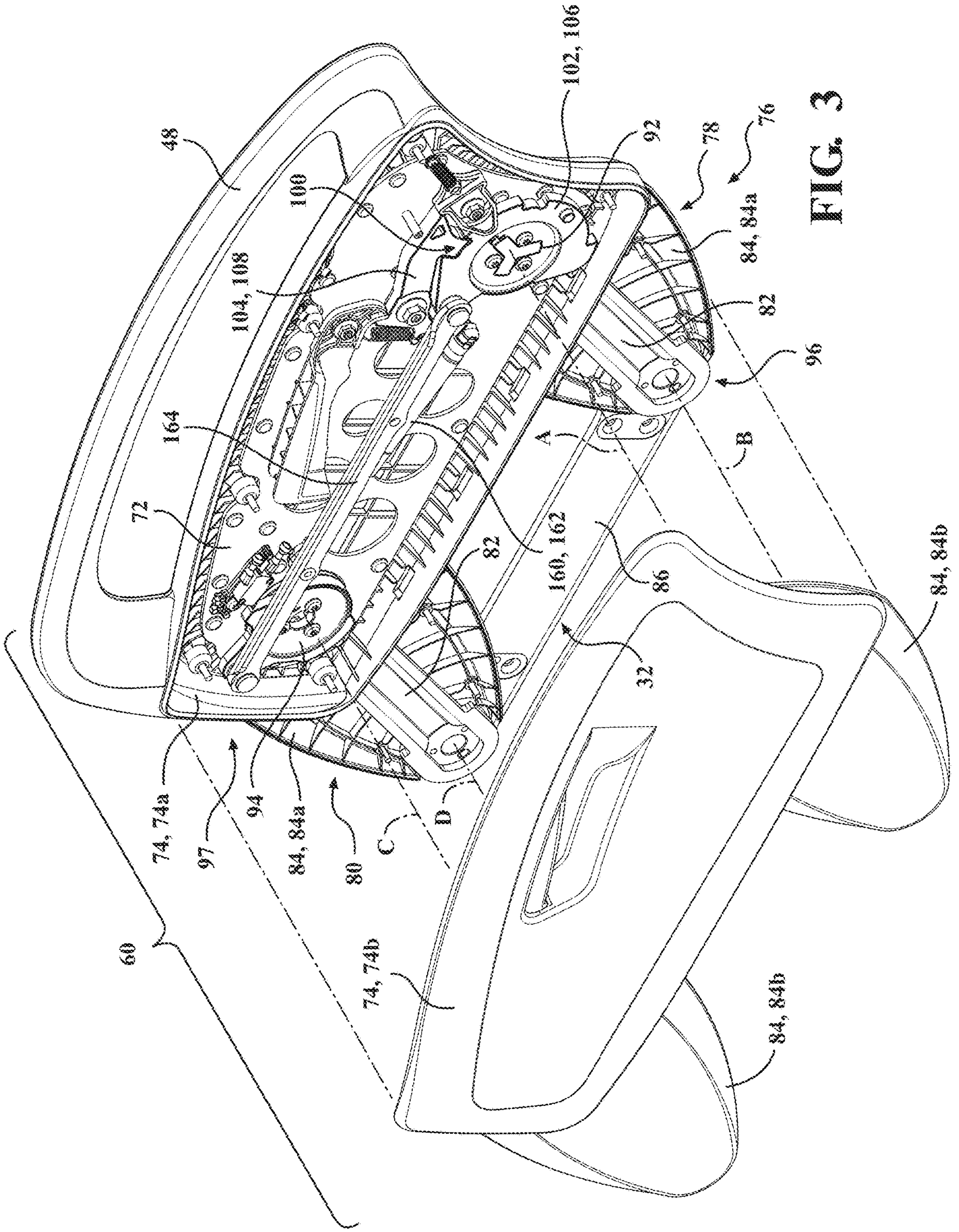
FIG. 3 is a front perspective view of a side rail assembly of the patient support apparatus with covers removed.

Referring to FIG. 3, the side rail 60 includes a includes a side rail frame 72 and a side rail cover 74 coupled to the side rail frame 72 to at least partially cover the side rail frame 72. In the version shown, the side rail cover 74 is formed in two pieces 74*a*, 74*b* that are fastened together using one or more fasteners, but that could be connected in any suitable manner, such as via welding, adhesive, and the like. The side rail cover 74 is sized and shaped to cover and at least partially enclose the side rail frame 72 and components coupled to the side rail frame 72 to keep them free of dust, debris, or other contaminants. The side rail cover 74 may be formed of plastic and the side rail frame 72 may be formed of metal, as will be described further below.

A support arm assembly 76 couples the side rail 60 to the support structure 32. In the embodiment shown in FIG. 2, each support arm assembly 76 includes a pair of support arms 78, 80, referred to herein as a first support arm 78 and a second support arm 80. The support arms 78, 80 are separate and spaced from one another. In other embodiments, the support arm assembly 76 may include only a single support arm or may include additional support arms. The support arms 78, 80 may be any shape, size, and/or configuration. For ease of illustration and description, only one support arm assembly 76 will be described in detail.

Each of the support arms 78, 80 includes a support arm frame 82 and an arm cover 84 to cover and at least partially enclose the support arm frame 82. In the version shown, the arm cover 84 is formed in two pieces 84*a*, 84*b*, that are fastened together using one or more fasteners, but that could be connected in any suitable manner, such as via welding, adhesive, and the like. The support arm frame 82 may be formed of metal and the arm cover 84 may be formed of plastic. In some embodiments, the support arms may include fewer or more components. In some embodiments, the support arms may be solid or hollow pieces of material having any shape and/or size.

The first support arm 78 is pivotally connected at a first end portion to the side rail 60 to pivot about a first side rail pivot axis A. More specifically, the support arm frame 82 of the first support arm 78 is pivotally connected at the first end portion to the side rail frame 72 to pivot about the first side rail pivot axis A. The first support arm 78 is pivotally connected at an opposing, second end portion to the support structure 32 to pivot about a first frame pivot axis B. More specifically, the support arm frame 82 of the first support arm 78 is pivotally connected at the second end portion to a support frame member 86 to pivot about the first frame pivot axis B. Note that the support frame member 86 (also referred to as a mounting bracket or support bracket) is ultimately mounted to a side of the intermediate frame 36, patient support deck 38, or other portion of the support structure 32 to mount the side rail assembly thereto. Thus, the support frame member 86 forms part of the support structure 32 (e.g., forms part of the intermediate frame 36, patient support deck 38, or other portion of the support structure 32 to which it is attached). See FIG. 1, for example, in which the support frame members 86 are shown are part of the intermediate frame 36 and the patient support deck 38.

The second support arm 80 is pivotally connected at a first end portion to the side rail 60 to pivot about a second side rail pivot axis C. More specifically, the support arm frame 82 of the second support arm 80 is pivotally connected at the first end portion to the side rail frame 72 to pivot about the second side rail pivot axis C. The second support arm 80 is pivotally connected at an opposing, second end portion to the support structure 32 to pivot about a second frame pivot axis D. More specifically, the support arm frame 82 of the second support arm 80 is pivotally connected at the second end portion to the support frame member 86 to pivot about the second frame pivot axis D.

Figure 4:
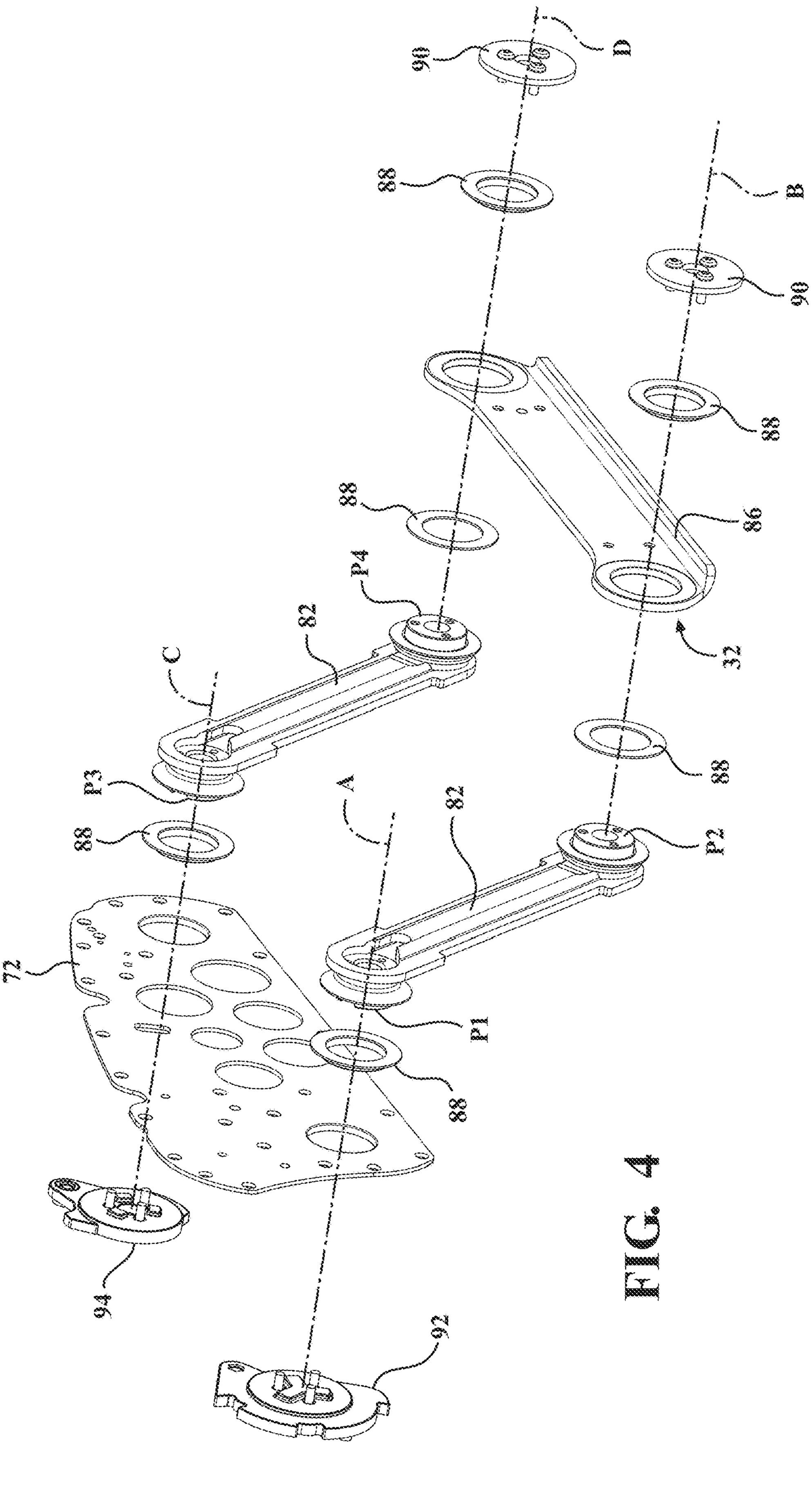
FIG. 4 is a partially exploded perspective view of a support arm arrangement that supports the side rail.

Referring to FIG. 4, pivot members P1, P2, P3, P4 pivotally couple the support arm frames 82 to the side rail frame 72 of the side rail 60 and to the support frame member 86 at the pivot axes A, B, C, D. The pivot members P1, P2, P3, P4 may include pivot shafts, pivot pins, and the like. Any suitable device may be employed to pivotally couple the support arms frames 82 to the side rail frame 72 and to the support frame member 86. In the embodiment shown in FIG. 4, the pivot members P1, P2, P3, P4 include a first side rail pivot member P1, a first frame pivot member P2, a second side rail pivot member P3, and a second frame pivot member P4. The first side rail pivot member P1 and the first frame pivot member P2 are pivot shafts fixed to the support arm frame 82 of the first support arm 78, such as by welding, fasteners, being integrally formed therewith, or the like. Likewise, the second side rail pivot member P3 and the second frame pivot member P4 are pivot shafts fixed to the support arm frame 82 of the second support arm 80, such as by welding, fasteners, being integrally formed therewith, or the like.

Bushings 88, bearings, or other similar components may be located between the pivot members P1, P2, P3, P4 and the respective side rail frame 72 or support frame member 86 to support relative rotation. Frame pivot plates 90 are connected and fixed to the frame pivot members P2, P4 with the support frame member 86 captured therebetween to axially secure the frame pivot members P2, P4 to the support frame member 86, while allowing rotation. Side rail pivot plates 92, 94 are connected to the side rail pivot members P1, P3 with the side rail frame 72 captured therebetween to axially secure the side rail pivot members P1, P3 to the side rail frame 72, while allowing rotation. The pivot members P1, P2, P3, P4 may be pivotally connected in any suitable manner that allows the support arms 78, 80 to pivot relative to the support structure 32 and relative to the side rail frame 72.

In the embodiment shown in FIGS. 3 and 4, by forming pivotal connections at the pivot axes A, B, C, D, the support arms 78, 80, the support frame member 86, and the side rail 60 form a four bar mechanism 96. In this four bar mechanism 96, the support frame member 86 acts as a fixed support structure such that, when raising and lowering the side rail 60, the support frame member 86 is stationary (unless being lifted or lowered itself), and the support arms 78, 80 and the side rail 60 move relative to the support frame member 86. In some embodiments, the support frame member 86 may move simultaneously with movement of the support arms 78, 80 and the side rail 60. In the version shown, a distance between the first side rail pivot axis A and the first frame pivot axis B is the same as a distance between the second side rail pivot axis C and the second frame pivot axis D. As a result, the orientation of the side rail 60 can be maintained throughout the range of motion of the side rail 60. In some embodiments, these distances may be different.

Figure 6:
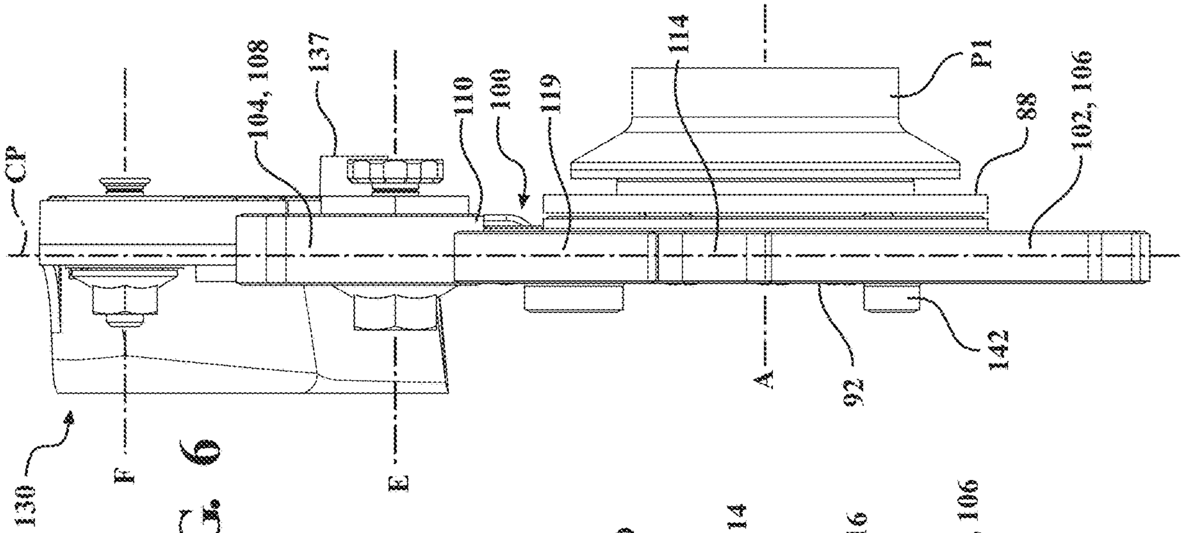
FIG. 6 is an end elevational view of the lock and manual release shown in FIG. 5 illustrating the lock and manual release being located to pivot in a common plane.
Figure 5:
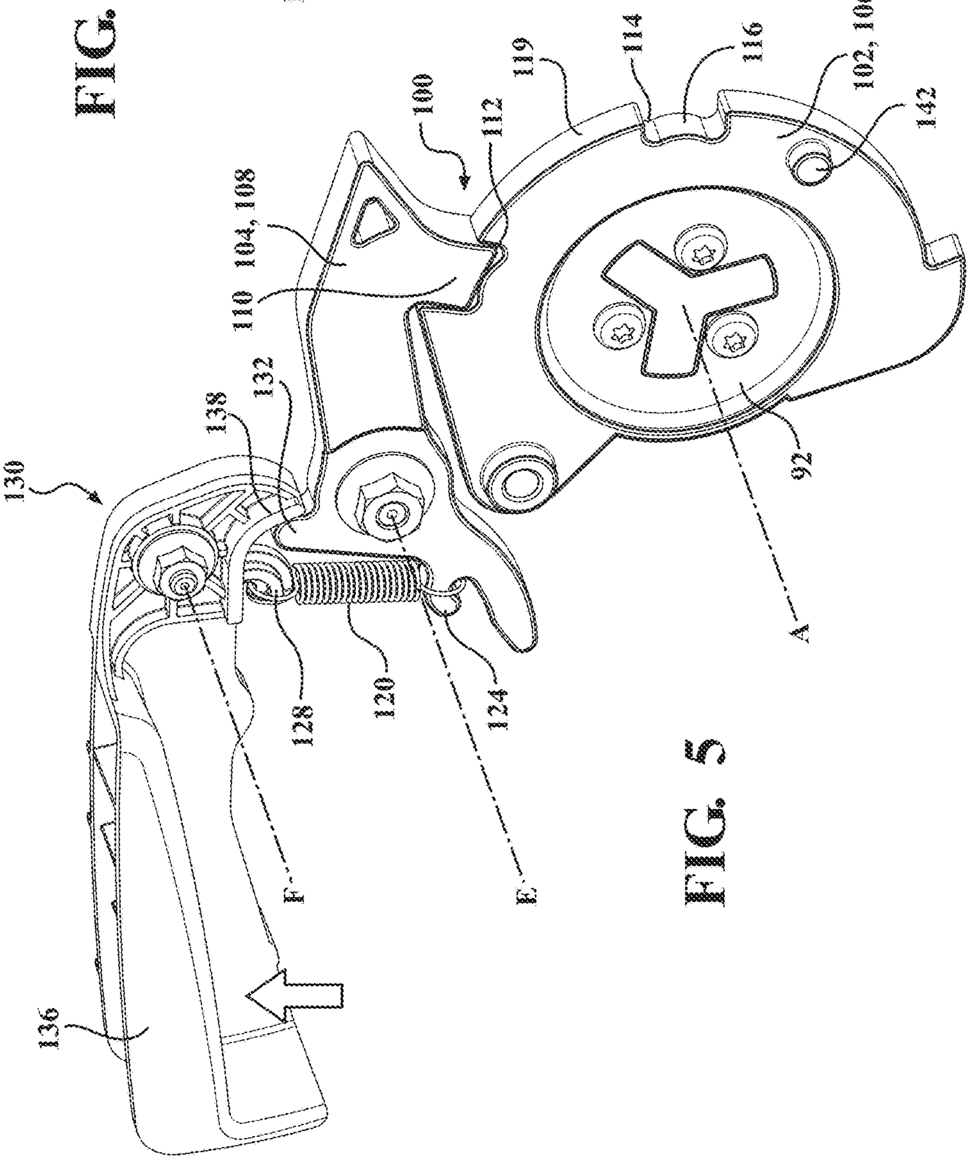
FIG. 5 is a front perspective view of a lock and manual release of the side rail assembly of FIG. 3, with other components of the side rail assembly removed.
Figure 7:
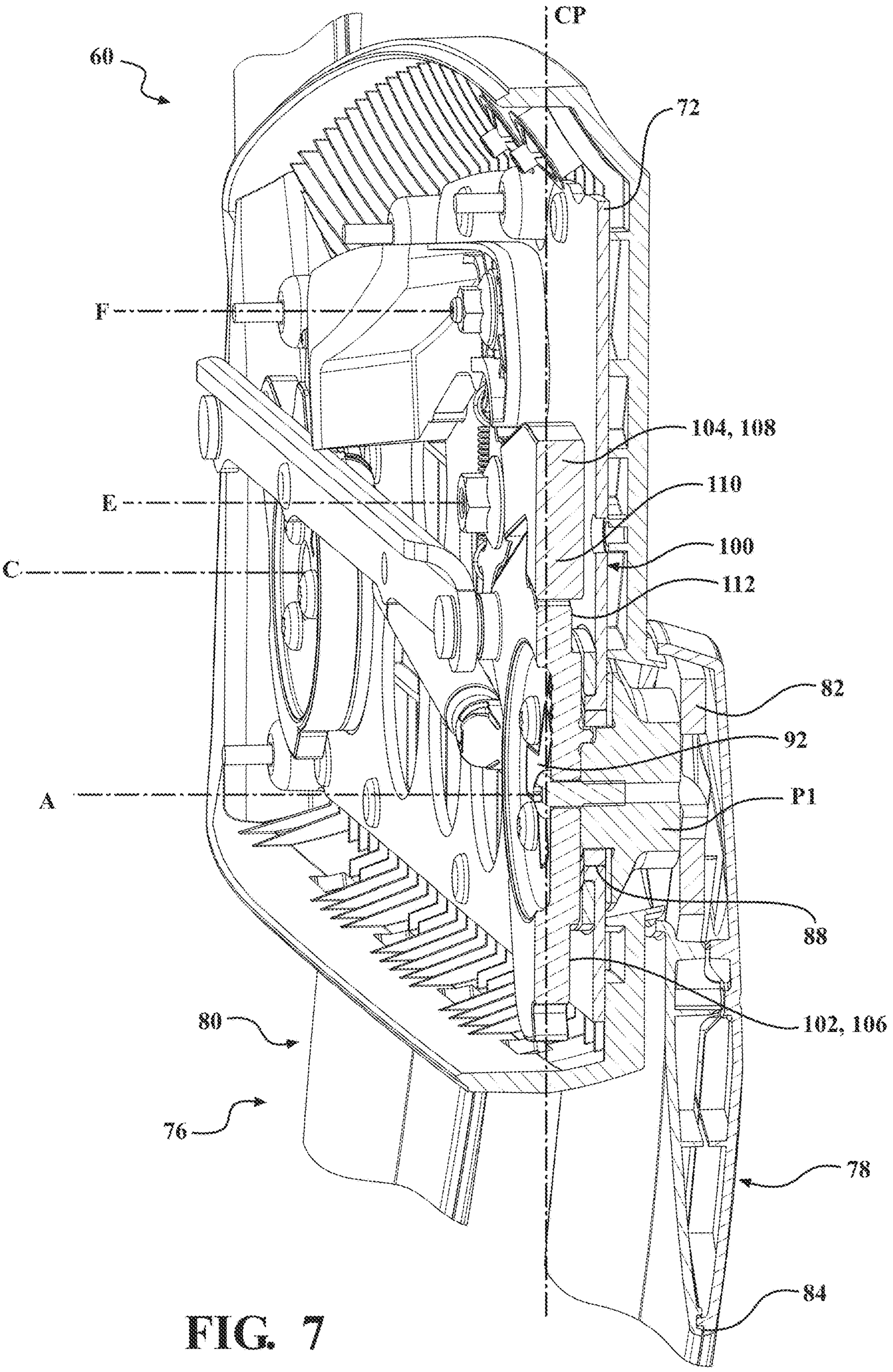
FIG. 7 is a cross-sectional, front perspective view of the lock of FIG. 5 attached to a side rail frame with one piece of a side rail cover removed.

Referring to FIGS. 5-7, a lock 100 is shown to releasably lock the side rail 60 in one or more discrete, side rail positions. For example, in some versions, the lock 100 is configured to lock the side rail 60 in the intermediate position 64 and the raised position 68 (see FIG. 2), with the side rail 60 being relatively free to move in all other positions, without requiring a user to release the lock 100. The lock includes a first lock body 102 and a second lock body 104 movable between locked and unlocked positions relative to the first lock body 102.

The first lock body 102 is pivotally connected to the side rail frame 72 of the side rail 60 (see FIG. 7) to pivot about the first side rail pivot axis A as the side rail 60 moves to the one or more side rail positions (side rail frame 72 removed in FIGS. 5 and 6 for ease of illustration). In the version shown, the first lock body 102 is integrated into the side rail pivot plate 92. In some embodiments, the first lock body 102 may be separate from the side rail pivot plate 92. The first lock body 102 is further defined as a latch disk 106 fixed to one of the support arms 78, 80 to pivot therewith relative to the side rail frame 72. In the version shown, the latch disk 106 is fixed to the first support arm 78 to pivot with the first support arm 78 about the first side rail pivot axis A.

The second lock body 104 is pivotally connected to the side rail frame 72 of the side rail 60 to pivot about a lock pivot axis E substantially parallel to the first side rail pivot axis A such that the first lock body 102 and the second lock body 104 pivot in a common plane CP (see FIGS. 6 and 7). The second lock body 104 is further defined as a latch pawl 108 that includes a projection 110. The latch disk 106 defines one or more notches 112, 114 (also referred to as recesses or openings) to receive the projection 110 in the locked position to releasably lock the side rail 60 in the one or more side rail positions. Each of the one or more notches 112, 114 is defined by a bottom surface 116 (see FIG. 5) and side surfaces, the bottom surface 116 having an arcuate shape with a peak portion shaped to abut the projection 110 in the locked position. The notches 112, 114 are shaped to receive the projection 110 in a manner that prevents further pivoting of the latch disk 106 relative to the side rail frame 72 to thereby lock the side rail 60 in position.

The one or more notches 112, 114 includes a first notch 112 and a second notch 114 spaced from the first notch 112 (see FIG. 5). The latch disk 106 has an arcuate outer surface 119 with the first notch 112 and the second notch 114 defined radially inwardly from the arcuate outer surface 119. The projection 110 is arranged to ride along the arcuate outer surface 119 when moving between the first and second notches 112, 114 as the side rail 60 is raised or lowered between the lowered position 62 and the raised position 68. The latch pawl 108 is configured to engage the first notch 112 in the locked position when the side rail 60 is in the raised position 68 and engage the second notch 114 in the locked position when the side rail 60 is in the intermediate position 64. The latch pawl 108 remains in the unlocked position when the side rail 60 is in the lowered position 62 and the full-height position 66. Other configurations are also contemplated in which the side rail 60 is locked at the lowered position 62, the full-height position 66, and/or other positions, with associated notches being provided accordingly.

As best shown in FIG. 5, a latch spring 120 is arranged to bias the latch pawl 108 toward the locked position so that as the projection 110 of the latch pawl 108 aligns with either of the notches 112, 114, the projection 110 is urged into the corresponding notch 112, 114 by the latch spring 120. The latch spring 120 may be a tension spring, compression spring, leaf spring, or any suitable biasing device. In the version shown, the latch spring 120 is a tension spring with one end of the latch spring 120 attached to a spring mount 124 of the latch pawl 108. An opposite end of the latch spring 120 is attached to a spring mount 128 of a manual release 130.

The manual release 130 is coupled to the side rail 60 and is operable to pivot the latch pawl 108 about the lock pivot axis E to move the latch pawl 108 to the unlocked position. The manual release 130 is pivotally connected to the side rail frame 72 of the side rail 60 to pivot about a release pivot axis F. The release pivot axis F is substantially parallel to the lock pivot axis E such that the latch disk 106, the latch pawl 108, and the manual release 130 pivot in the common plane CP or in planes parallel to the common plane. It should be understood that the term substantially parallel accounts for manufacturing tolerances and other slight deviations from parallel, and is intended to encompass, for example, situations where pivot axes are tilted relative to one another by 10 degrees or less, 5 degree or less, and the like.

The manual release 130 includes a release lever having a handle 136 to actuate the release lever. The latch pawl 108 includes a radially protruding portion 132 (also referred to as a release tab or release projection) and the release lever also includes a cam 138 to engage the radially protruding portion 132 so that the release lever is capable of pivoting the latch pawl 108 about the lock pivot axis E to the unlocked position against the bias of the latch spring 120. When the handle 136 is actuated, by the user pulling upwardly on the handle as shown by an arrow in FIG. 5, the cam 138 pivots about the release pivot axis F while engaging the radially protruding portion 132 to pivot the latch pawl 108 (counterclockwise in FIG. 5) about the lock pivot axis E and lift the projection 110 out from the notch 112, 114 in which it is seated. Thus, unlocking of the side rail 60 is caused by the handle 136 applying a force to the lock 100 to cause the projection 110 to follow the same trajectory when unlocking as it followed when locking. When the user lifts the handle 136, the result is a torque that pivots the projection 110 of the latch pawl 108 out of the latch disk 106 thereby unlocking the side rail 60. During this operation, the latch spring 120 expands by virtue of the spring mounts 124, 128 moving away from each other.

When the handle 136 is released by the user, the handle 136 returns to its normal, unactuated position by virtue of the latch spring 120. A stop 137 (see FIG. 6) is provided on the handle 136 to limit its return rotation by abutting a top of a corresponding slot 139 in the side rail frame 72 (see FIG. 13). Here, it will be appreciated that the slot 139 may be sized and shaped to prevent or otherwise limit excessive movement of the handle 136 relative to the side rail frame 72. At the same time, if the projection 110 has moved out of the notch 112, 114 and the side rail 60 has been moved so that the projection 110 no longer aligns with either of the notches 112, 114, then the latch spring 120 biases the projection 110 of the latch pawl 108 toward the arcuate outer surface 119 to maintain contact with the arcuate outer surface 119 so that when the projection 110 again aligns with one of the notches 112, 114, the projection 110 will fall into the corresponding notch 112, 114. The latch spring 120 is thus a single spring that acts to continuously bias both the handle 136 into its unactuated position and to bias the latch pawl 108 toward its locked position.

Figure 8:
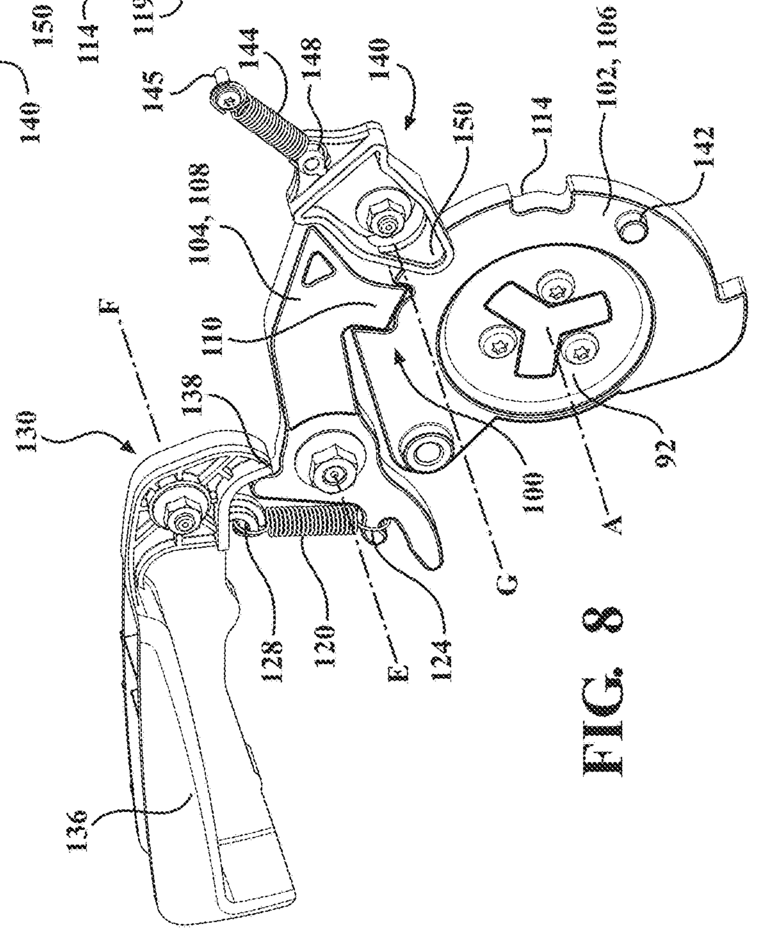
FIG. 8 is a front perspective view of the lock, the manual release, and a bypass lever of the side rail assembly of FIG. 3, with other components of the side rail assembly removed.

Referring to FIG. 8, a bypass lever 140 is provided to allow a user to raise the side rail 60 from the lowered position 62 to the raised position 68 without requiring the user to actuate the handle 136 and without getting hung up in the intermediate position 64 (via the second notch 114). The bypass lever 140 is pivotally connected to the side rail frame 72 (removed in FIGS. 8 and 9) to pivot about a bypass pivot axis G that is substantially parallel with the release pivot axis F to selectively engage the latch pawl 108 such that the latch pawl 108 bypasses the second notch 114 when the side rail 60 is raised. This avoids a user from being required to release the lock 100 at the intermediate position 64 when raising the side rail 60 from the lowered position 62 to the raised position 68. The bypass lever 140 is arranged to prohibit the projection 110 of the latch pawl 108 from engaging the second notch 114 when the side rail 60 is raised and to allow the projection 110 of the latch pawl 108 to engage the second notch 114 when the side rail 60 is lowered.

Figure 9:
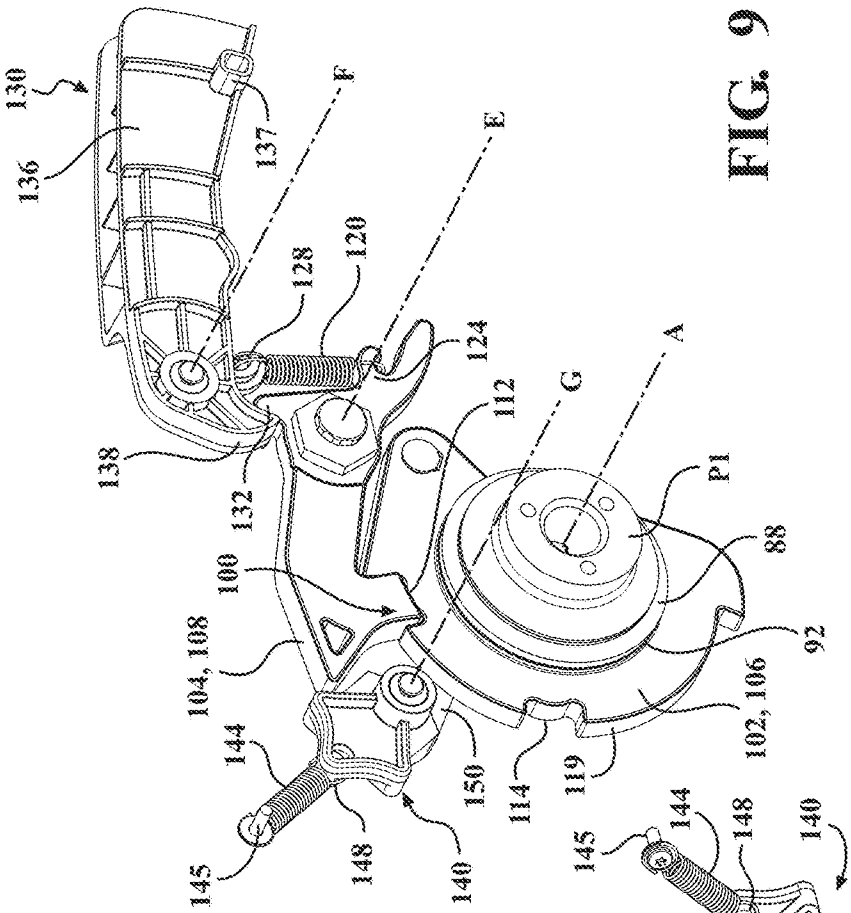
FIG. 9 is a rear perspective view of the lock, the manual release, and the bypass lever of FIG. 8.

The latch disk 106 includes a bypass driver 142 shaped to engage the bypass lever 140 to move the bypass lever 140 into engagement with the latch pawl 108. This automatic engagement occurs when the latch disk 106 pivots about the first side rail pivot axis A during raising of the side rail 60, as described further below. A bypass spring 144 has one end connected to a spring mount 145 fixed to the side rail frame 72 and an opposite end connected to a spring mount 148 of the bypass lever 140 to bias the bypass lever 140 into a neutral position, as shown in FIGS. 8 and 9. The bypass lever 140 includes a bypass finger 150 and the bypass driver 142 is shaped to engage the bypass finger 150 and pivot the bypass lever 140 against the bias of the bypass spring 144 to engage the latch pawl 108 and prohibit the projection 110 of the latch pawl 108 from engaging the second notch 114 when the side rail 60 is raised. In the embodiment shown, the bypass driver 142 is a pin protruding from a side of the latch disk 106.

Figure 10C:
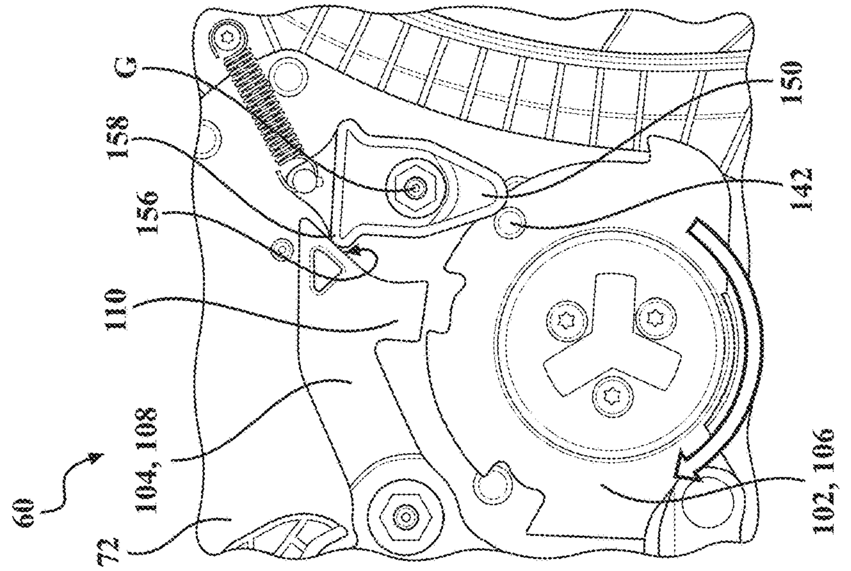
FIGS. 10A-10C illustrate operation of the bypass lever.
Figure 10B:
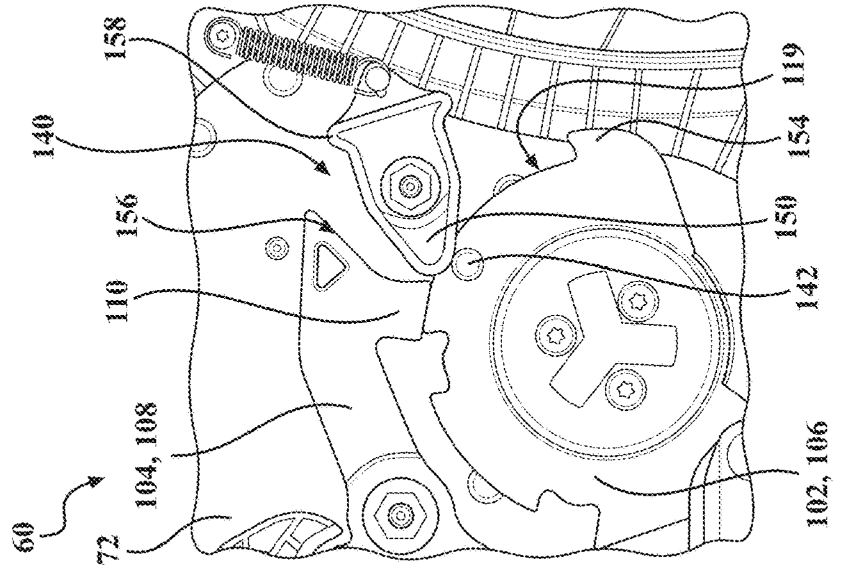
Figure 10A:
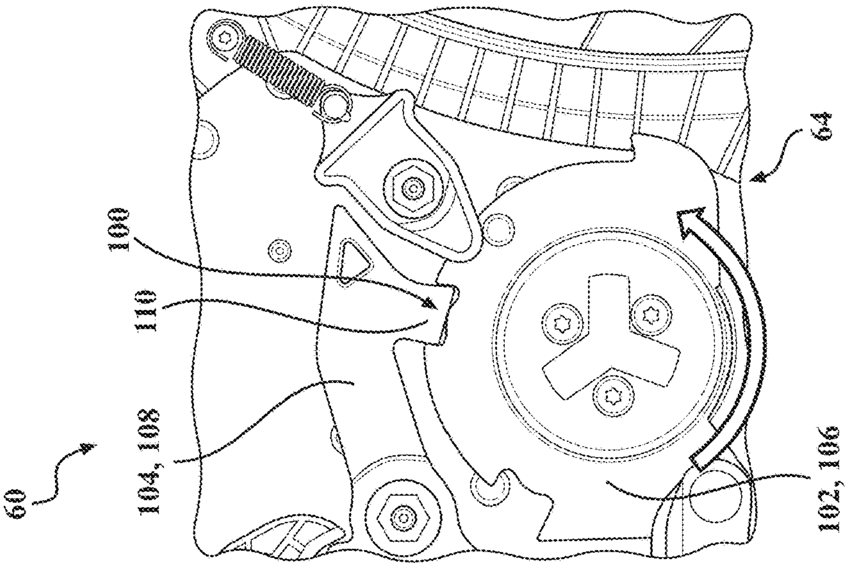

FIGS. 10A through 10C show a progression of movement of the side rail 60 to illustrate operation of the bypass lever 140. First, referring to FIG. 10A, the side rail 60 is locked in the intermediate position 64 (such as when the side rail 60 is lowered). Next, the latch pawl 108 is moved to the unlocked position (FIG. 10B) by virtue of the lock 100 being released by the user (using the manual release 130) and the side rail 60 is further lowered by the user toward the lowered position 62. Accordingly, the projection 110 now can ride along the arcuate outer surface 119 until the projection 110 reaches an abutment 154 on the latch disk 106 at which point the side rail 60 is fully lowered to the lowered position 62 (position not shown). As shown in FIG. 10B, as the latch disk 106 pivots/rotates (see arrow) relative to the side rail frame 72, the projection 110 continues to ride along the arcuate outer surface 119 unimpeded by the bypass lever 140.

FIG. 10C shows the situation is which the user is raising the side rail 60 from the lowered position 62. When this occurs, the latch disk 106 pivots in an opposite direction from FIG. 10B relative to the side rail frame 72 (see arrow), and this time the pin of the bypass driver 142 engages the bypass finger 150 on a side of the bypass finger 150 to urge the bypass lever 140 to pivot about the bypass pivot axis G into a position that causes engagement with the latch pawl 108 before the second notch 114 is reached by the projection 110. A shown, the latch pawl 108 has a cammed surface 156 shaped to be engaged and lifted by a shoulder 158 on the bypass lever 140. Once the pin of the bypass driver 142 passes the bypass finger 150, the bypass lever 140 returns to its neutral position. In the version shown, the pin of the bypass driver 142 also acts to ensure that the bypass lever 140 does not interfere with the latch pawl 108 when the side rail 60 is lowered (FIG. 10B). More specifically, the pin of the bypass driver 142 engages the bypass finger 150 on an opposing side of the bypass finger 150 to thereby push the shoulder 158 away from the cammed surface 156 to ensure that the shoulder 158 does not inhibit movement of the latch pawl 108.

Figure 11:
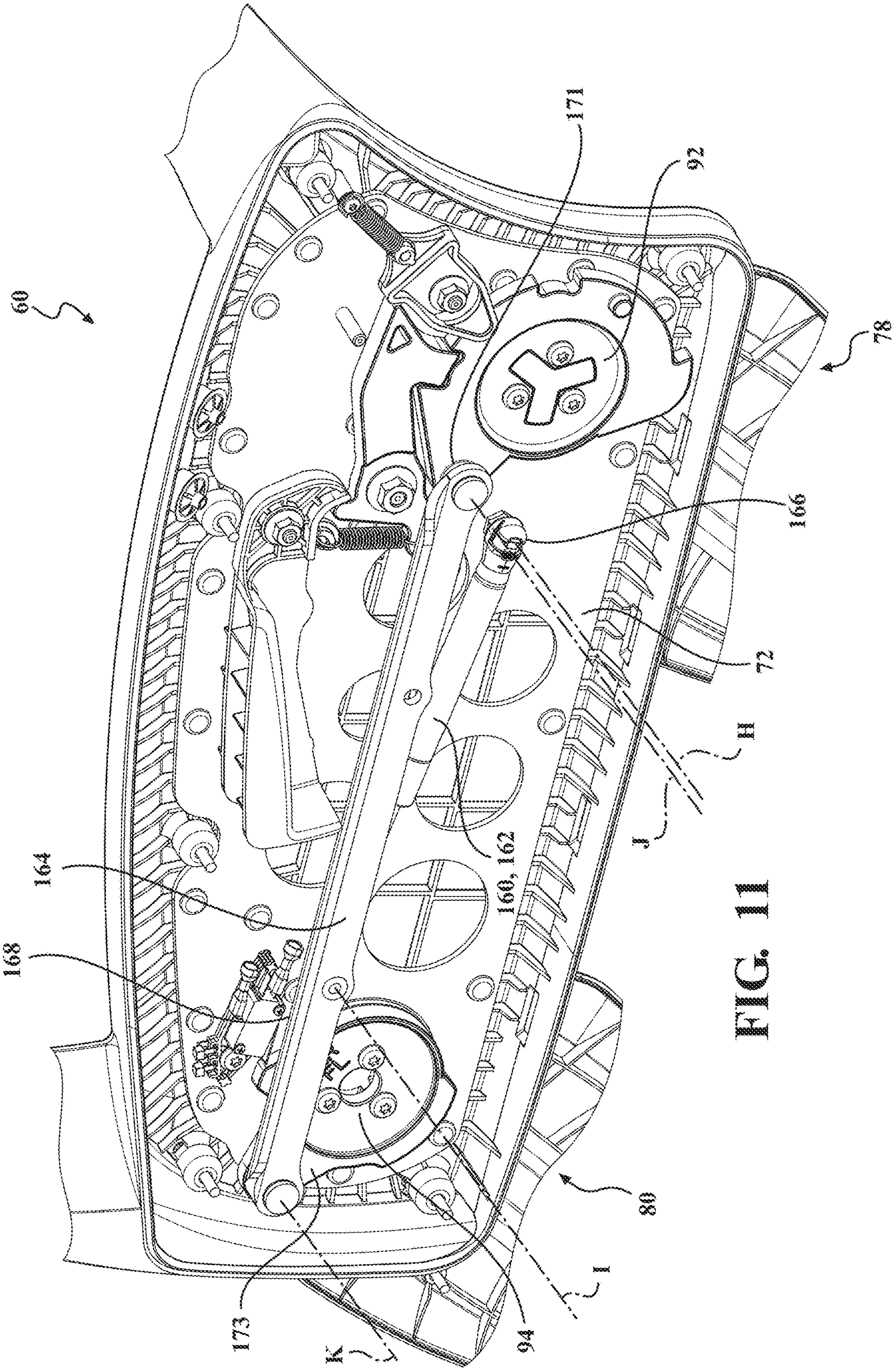
FIG. 11 is a front perspective view of the side rail illustrating a damper.

As shown in FIG. 11, a damper 160 is mounted in the side rail 60 and is at least partially covered by the side rail cover 74 (part of cover removed in FIG. 11). The damper 160 is disposed inside the side rail 60, for example, to improve infection control and aesthetics (as opposed to an exposed damper), and to reduce interference with other components on the patient support apparatus 30.

As shown in FIG. 2, the side rail 60 is movable in either a clockwise or counterclockwise direction from the full-height position 66 in which the side rail 60 is fully extended from the support structure 32 by the pair of support arms 78, 80 (and the pivot axes A, B, C, D form corners of a rectangle). The side rail 60 has a weight and the damper 160 is arranged to counterbalance the weight of the side rail 60 when the side rail 60 moves in either the clockwise or counterclockwise direction from the full-height position 66.

Figure 12A:
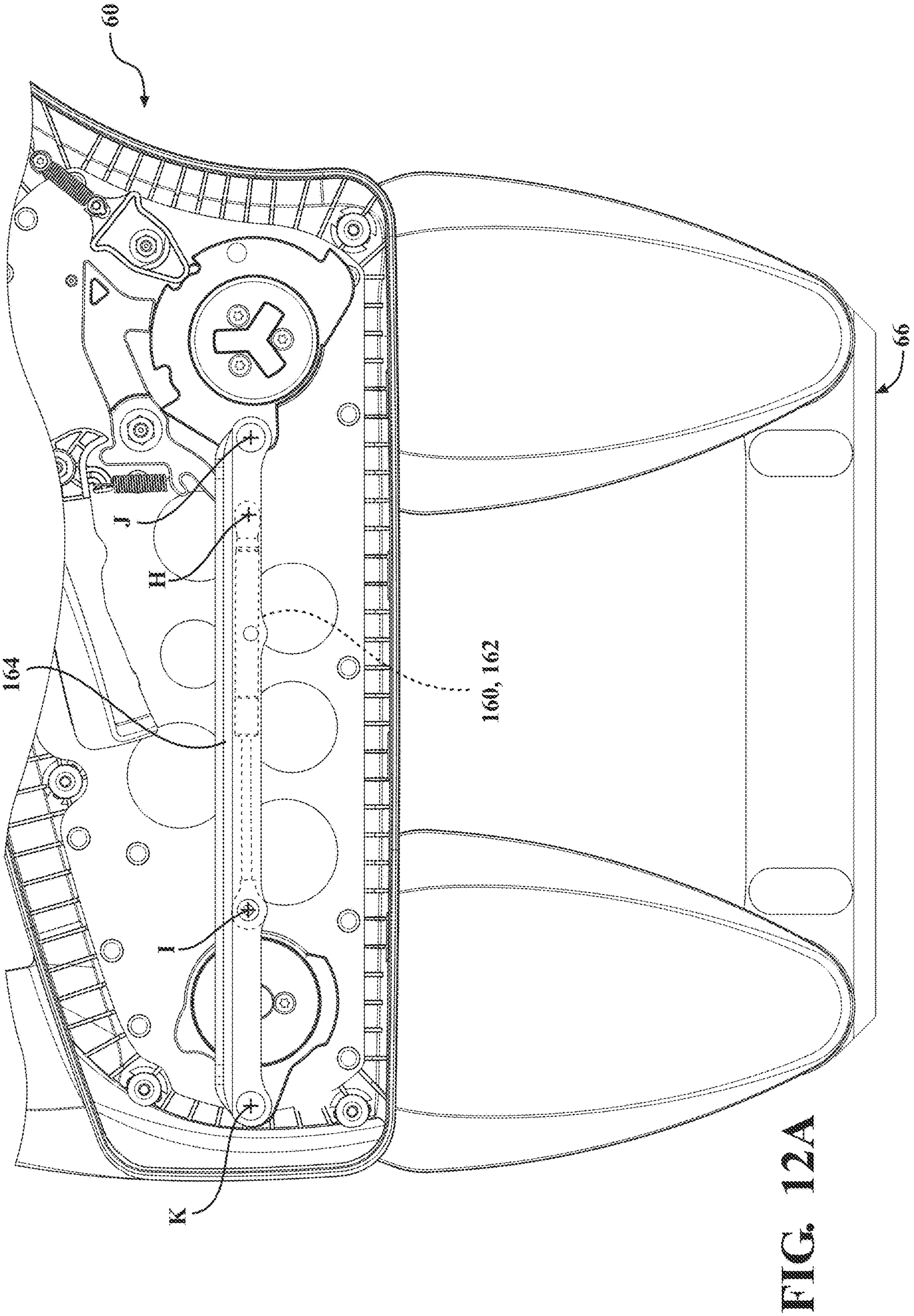
FIGS. 12A-12C illustrate operation of the damper.
Figure 12B:
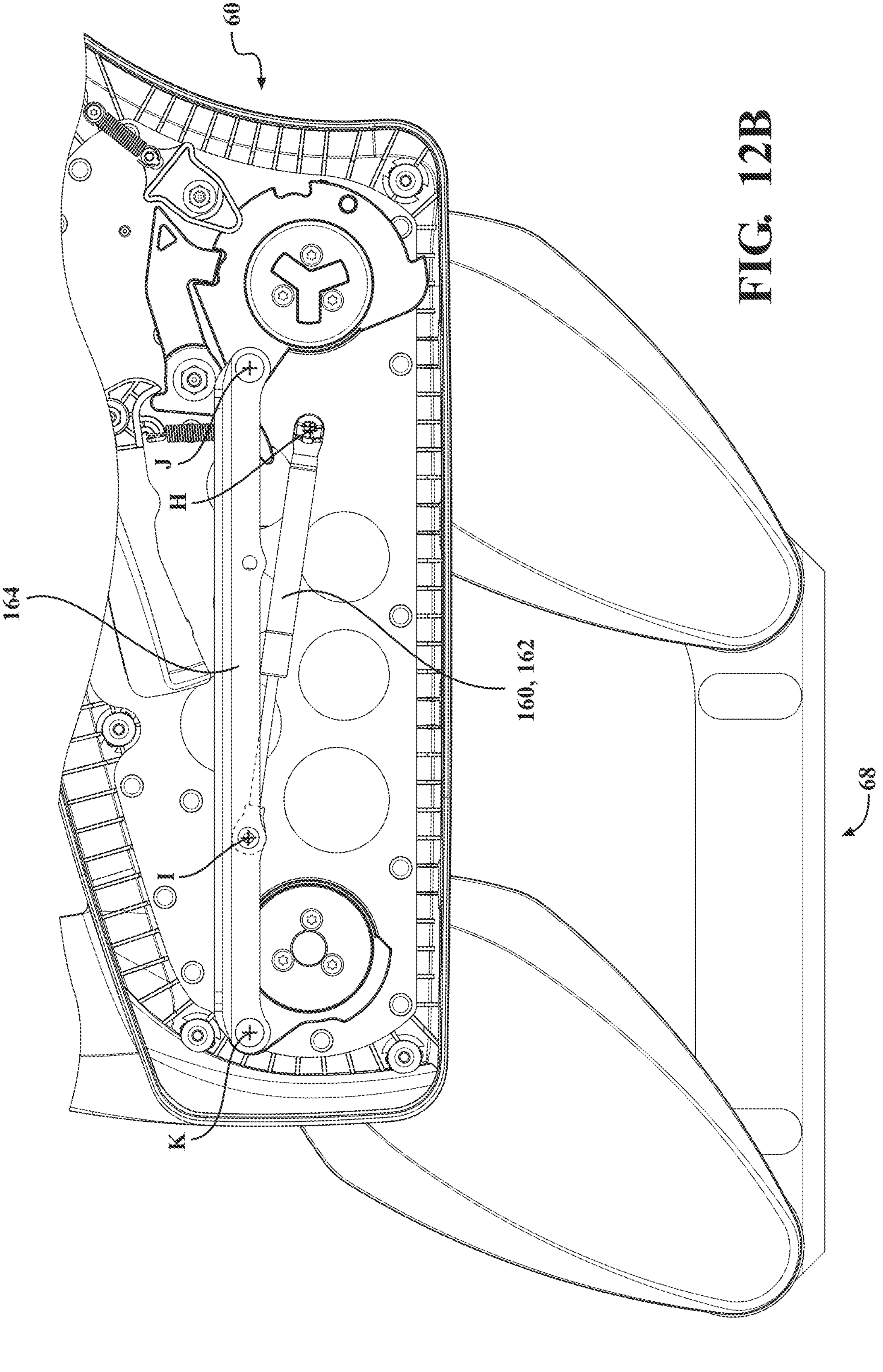
Figure 12C:
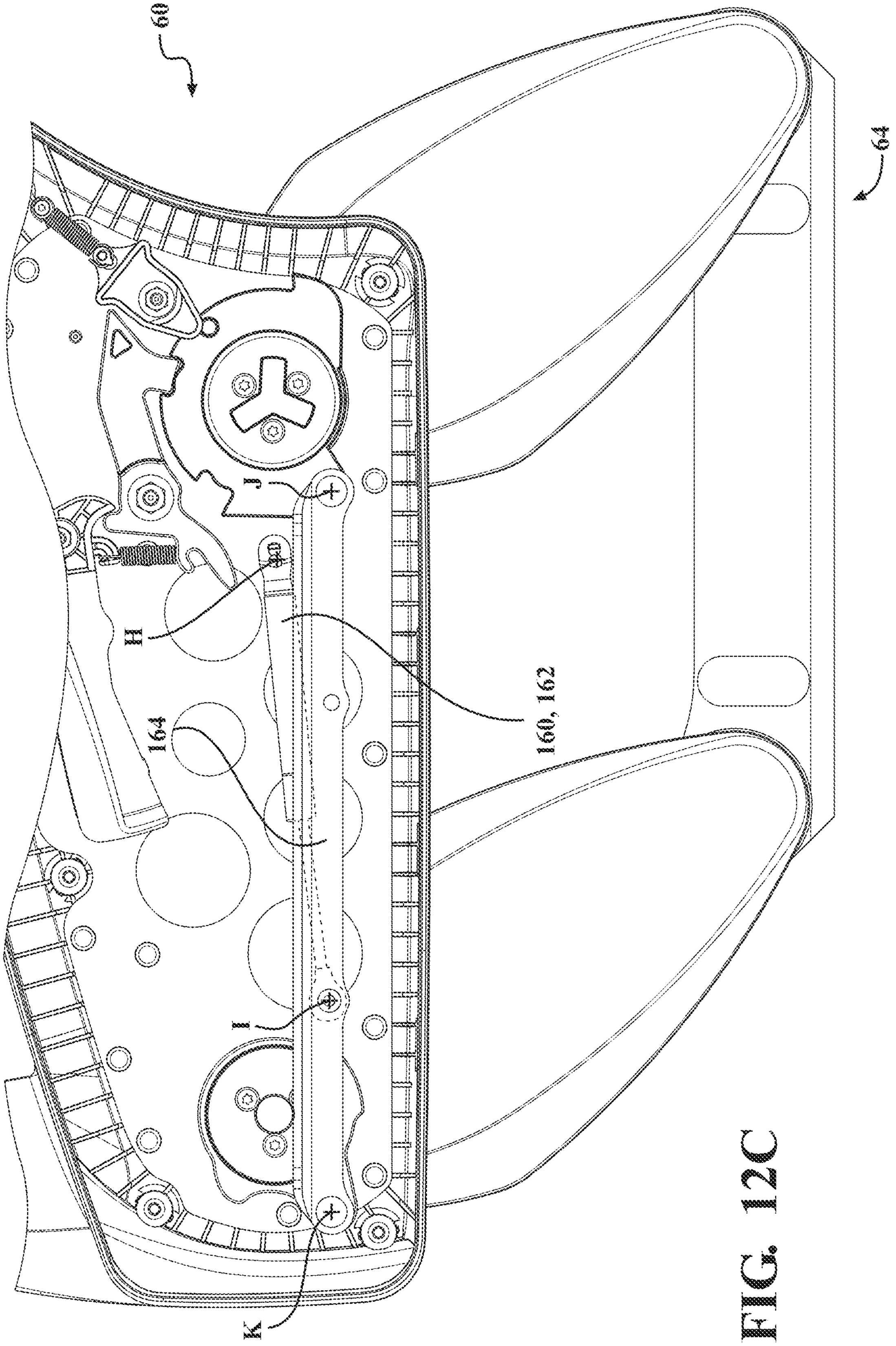

The damper 160 includes a gas spring 162 arranged to expand when the side rail 60 moves in the clockwise and counterclockwise directions toward the full-height position 66 (full-height position also shown in FIG. 12A) and compress when the side rail 60 moves in the clockwise and counterclockwise directions away from the full-height position 66 (as shown in FIGS. 12B and 12C).

A timing link 164 is coupled to the pair of support arms 78, 80. As best shown in FIG. 3, the timing link 164 is provided to create a second four bar mechanism 97 with the pivot plates 92, 94 and the side rail frame 72 to prevent the side rail assembly and the four bar mechanism 96 from hitching at its toggle point (also referred to as a change point), which would otherwise allow the side rail 60 to change orientation.

Referring back to FIG. 11, the gas spring 162 has a first end portion 166 pivotally connected to the side rail frame 72 to pivot about a first gas spring pivot axis H and a second end portion 168 pivotally connected to the timing link 164 to pivot about a second gas spring pivot axis I. Timing link brackets 171, 173 are fixed to the pair of support arms 78, 80, such as by being fixed to the side rail pivot plates 92, 94. The timing link 164 is pivotally connected to the timing link brackets 171, 173 to pivot about timing link pivot axes J, K when the timing link 164, inside the side rail 60, rotates with the support arms 78, 80.

FIG. 12A shows the side rail 60 in the full-height position 66 in which the timing link pivot axes J, K and the gas spring pivot axes H, I are generally in alignment (note that the timing link 164 is shown in phantom). The first gas spring pivot axis H is arranged to fall out of this alignment during movement of the side rail 60 in the clockwise or counterclockwise direction away from the full-height position 66. FIG. 12B, for example, shows the side rail 60 in the raised position 68 in which the first gas spring pivot axis H is out of the alignment and below the timing link 164 (similarly shown in FIG. 11). FIG. 12C shows the side rail 60 in the intermediate position 64 in which the first gas spring pivot axis H is out of alignment and above the timing link 164.

Comparing FIG. 12A to FIG. 12B, the gas spring 162 is compressed (pivot axes H, I are closer together) to ease lowering of the side rail 60 from the full-height position 66 to the raised position 68 and is thereby ready, in its compressed state, to assist the user when moving from the raised position 68 back toward the full-height position 66. Comparing FIG. 12A to FIG. 12C, the gas spring 162 is compressed to ease lowering of the side rail 60 from the full-height position 66 to the intermediate position 64 and is thereby ready, in its compressed state, to assist the user when moving from the intermediate position 64 back toward the full-height position 66. If the side rail 60 were further lowered toward the lowered position 62, the gas spring 162 would compress further to ease lowering and thereafter be ready to assist the user to move the side rail 60 back toward the full-height position 66.

The side rail 60 is of a type that rotates bi-directionally over-center by virtue of rotating from the full-height position 66 in either the clockwise or counterclockwise directions. The gas spring 162 provides a linear force output to bi-directionally provide a non-linear counterbalance to the side rail 60. More specifically, the gas spring 162 is positioned so that it extends for a portion of the motion of the side rail 60 (when moving toward the full-height position 66 from either direction) and then compresses for a portion of the motion of the side rail 60 (when moving away from the full-height position 66 in either direction). This configuration allows a single gas spring 162 to counterbalance the full motion of the side rail 60, bi-directionally, rather than requiring multiple gas springs. Of course, additional gas springs or other forms of dampers may also be employed in some embodiments.

Figure 13:
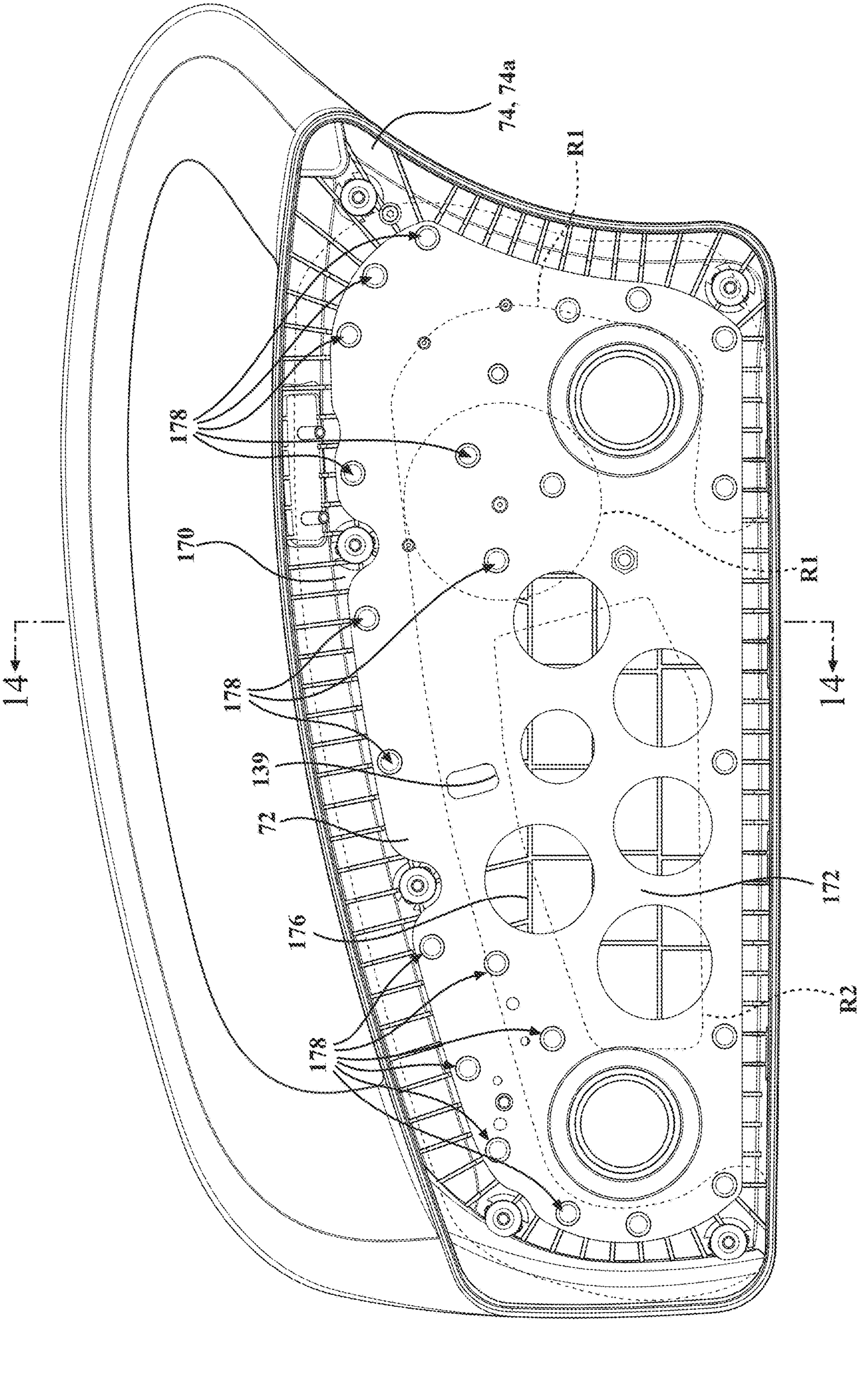
FIG. 13 is a front view of a side rail of the side rail assembly.
Figure 14:
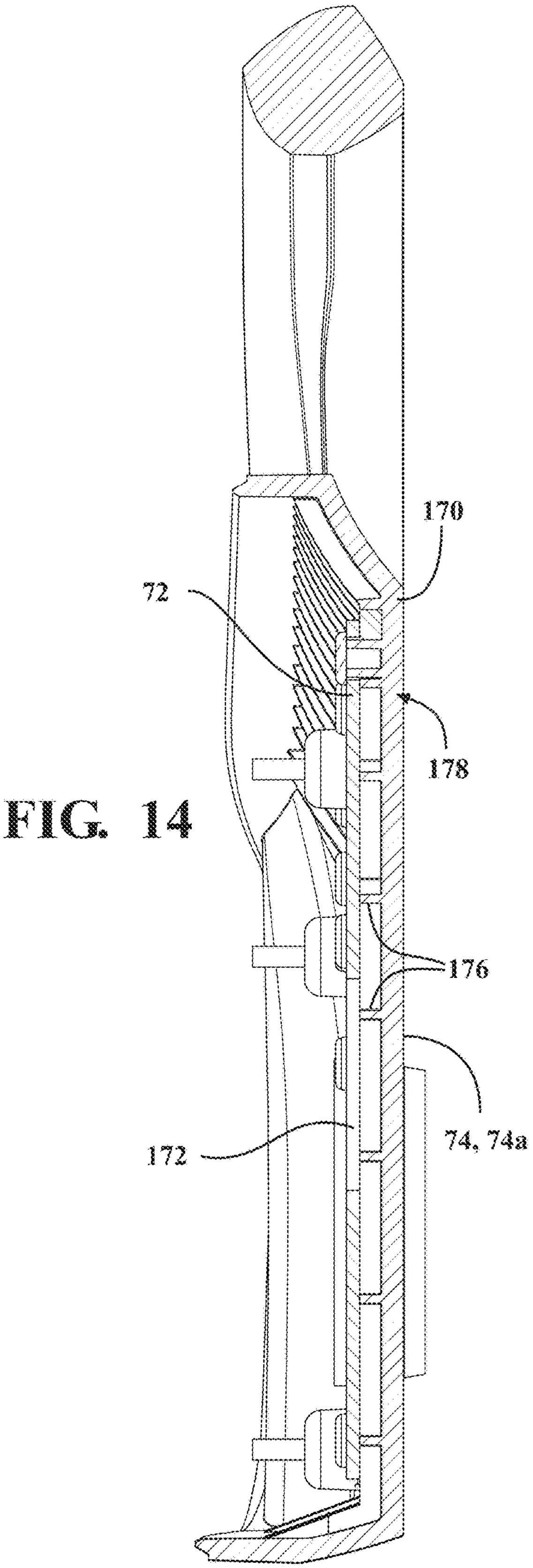
FIG. 14 is a cross-sectional view taken along the line 14-14 in FIG. 13.
Figure 15:
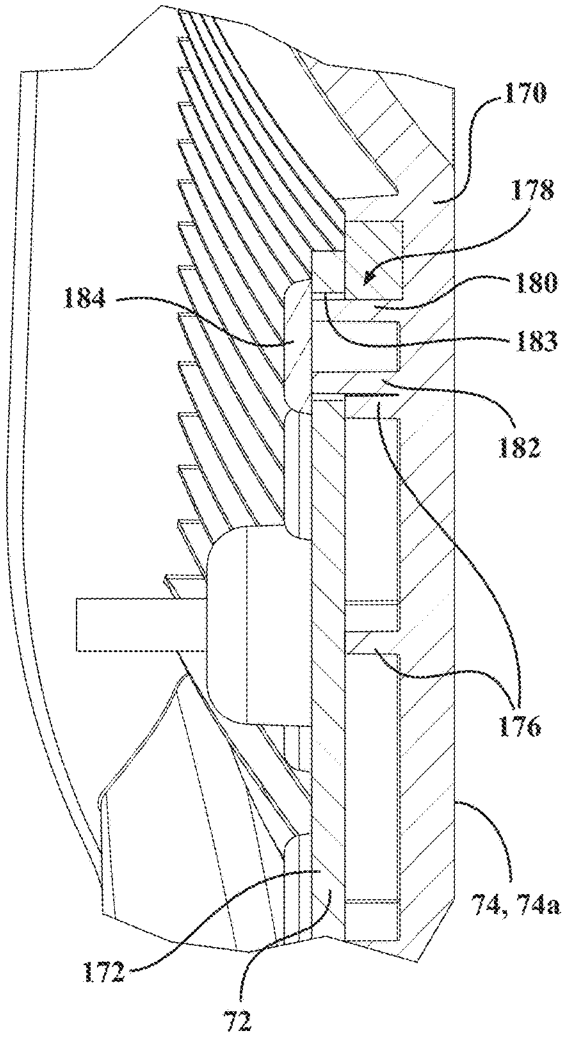
FIG. 15 is a close-up view of a heat stake and rib from FIG. 14.

Referring to FIGS. 13-15, the side rail cover 74 includes a first wall 170 formed at least partially of plastic. The side rail frame 72 includes a second wall 172 formed at least partially of metal. As best shown in FIGS. 14 and 15, the second wall 172 is spaced from the first wall 170 by a plurality of ribs 176 (also referred to as spacing walls) integral with the first wall 170. The ribs 176 are integrally formed with the first wall 170 and extend toward and touch the second wall 172. The height of the ribs 176 establishes the separation or distance between the first and second walls 170, 172.

A plurality of heat stakes 178 connect the second wall 172 to the first wall 170. The locations and distribution density of the heat stakes 178 shown in FIG. 13 is varied to provide varying stiffness/strength to meet certain push-pull requirements. In some embodiments, the distribution density of the heat stakes 178 may be higher in order to provide additional stiffness and/or strength in particular areas (not shown in detail). A pair of first regions R1 (delineated by phantom line boundaries) where high strength is required and a second region R2 (also delineated by a phantom line boundary), where relatively low strength is required, are shown in FIG. 13. Notably, the first regions R1 are generally located about an outer periphery of the side rail frame 72 and near a location of operation of the lock 100 and the bypass lever 140. The second region R2 is located inboard of the outer periphery. The side rail frame 72 has been formed with several openings in the second region R2 to save material and reduce weight since strength requirements are lower in the second region R2 than the first regions R1.

Referring to FIG. 15, each of the heat stakes 178 includes a cylinder 180 formed at least partially of plastic having a base 182 integral with the first wall 170. The cylinder 180 extends through the second wall 172 and terminates at a cap 184 securing the second wall 172 to the first wall 170. During manufacture, the cylinder 180 is passed through an opening 183 defined in the second wall 172 to extend beyond the second wall 172. The portion of the cylinder 180 extending beyond the second wall 172 is then melted to form a rigid dome (cap 184) and thereby joins the first and second walls 170, 172.

In the version shown, the first wall 170 and the heat stakes 178 are formed of thermoplastic resin and the second wall 172 is formed of steel. Other suitable materials may also be used. The thermoplastic resin is selected to give the side rail 60 certain characteristics (e.g., warm to touch, light weight, soft corners, etc.), while the steel forming the second wall 172 is selected to give the side rail 60 other characteristics (e.g., strength and ability to withstand stress, economical to make precision features for the four bar mechanism 96, and formable to distribute load). Ultimately, the arrangement of the first wall 170, the second wall 172, and the heat stakes 178 provide a laminated composite structure that is light, strong, and relatively in-expensive.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus comprising:

a support structure having a patient support deck; and a side rail coupled to the support structure and movable relative to the support structure, the side rail including:

a side rail frame defining a frame wall formed at least partially of metal, a gas spring operatively attached to the side rail frame, a cover defining a cover wall formed at least partially of thermoplastic and shaped to at least partially cover the side rail frame and the gas spring, the cover including a plurality of thermoplastic mounts extending from the cover wall and bonded to the side rail frame to connect the frame wall to the cover wall.

2. The patient support apparatus of claim 1, wherein the frame wall is spaced from the cover wall by a plurality of ribs formed integrally with the cover wall.

3. The patient support apparatus of claim 2, wherein the plurality of thermoplastic mounts are further defined as a plurality of heat stakes.

4. The patient support apparatus of claim 3, wherein the side rail frame includes a plurality of openings defined in the frame wall; and wherein the plurality of heat stakes each at least partially extends through a respective one of the plurality of openings.

5. The patient support apparatus of claim 4, wherein each of the plurality of heat stakes includes a respective cylinder having a base integral with the cover wall, extending through a respective one of the plurality of openings defined in the frame wall, and terminating at a cap securing the cover to the side rail frame.

6. The patient support apparatus of claim 1, further comprising a lock to releasably lock the side rail in one or more side rail positions, and a manual release coupled to the side rail and operable to release the lock.

7. The patient support apparatus of claim 6, wherein the lock includes a latch disk pivotably coupled to the side rail about a first pivot axis, and a latch pawl pivotably coupled to the side rail about a second pivot axis substantially parallel to and spaced from the first pivot axis such that the latch disk and the latch pawl pivot in a common plane, the latch pawl being movable relative to the latch disk between a locked position engaged with the latch disk, and an unlocked position disengaged from the latch disk; and wherein the manual release is operable to pivot the latch pawl about the second pivot axis to move the latch pawl out of engagement with the latch disk and into the unlocked position.

8. The patient support apparatus of claim 7, wherein the manual release is pivotally coupled to the side rail about a third pivot substantially parallel to the second pivot axis such that the latch disk, the latch pawl, and the manual release pivot in the common plane.

9. The patient support apparatus of claim 8, wherein the latch disk, the latch pawl, and the manual release are each pivotally connected to the side rail frame.

10. The patient support apparatus of claim 9, further comprising a pair of support arms each having a first end portion pivotally connected to the side rail frame and a second end portion pivotally connected to the support structure; and wherein the latch disk is fixed to one of the pair of support arms to pivot with the one of the pair of support arms relative to the side rail frame.

11. The patient support apparatus of claim 7, wherein the latch pawl includes a projection; and wherein the latch disk defines one or more notches to receive the projection in the locked position to releasably lock the side rail in the one or more side rail positions.

12. The patient support apparatus of claim 11, wherein each of the one or more notches is defined by a bottom surface and side surfaces, the bottom surface having an arcuate shape with a peak portion shaped to abut the projection in the locked position.

13. The patient support apparatus of claim 11, including a latch spring arranged to bias the latch pawl toward the locked position; and wherein the latch pawl includes a radially protruding portion and the manual release includes a release lever having a handle to actuate the release lever and a cam to engage the radially protruding portion so that the release lever is capable of pivoting the latch pawl about the second pivot axis to the unlocked position against the bias of the latch spring.

14. The patient support apparatus of claim 11, wherein the one or more notches includes a first notch and a second notch and the latch disk has an arcuate outer surface with the first notch and the second notch defined radially inwardly from the arcuate outer surface, the projection being arranged to ride along the arcuate outer surface when moving between the first and second notches.

15. The patient support apparatus of claim 14, wherein the one or more side rail positions includes a raised position and an intermediate position and the latch pawl is configured to:

engage the first notch in the locked position when the side rail is in the raised position;

engage the second notch in the locked position when the side rail is in the intermediate position; and remain in the unlocked position when the side rail is in a lowered position.

16. The patient support apparatus of claim 15, further comprising a bypass lever pivotally connected to the side rail to selectively engage the latch pawl such that the latch pawl bypasses the second notch.

17. The patient support apparatus of claim 16, wherein the bypass lever is arranged to prohibit the projection of the latch pawl from engaging the second notch when the side rail is raised and to allow the projection of the latch pawl to engage the second notch when the side rail is lowered.

18. The patient support apparatus of claim 17, wherein the latch disk includes a bypass driver shaped to engage the bypass lever to move the bypass lever into engagement with the latch pawl to bypass the second notch when the latch disk pivots about the first pivot axis.

19. The patient support apparatus of claim 18, further comprising a bypass spring to bias the bypass lever into a neutral position; and wherein the bypass lever includes a bypass finger and the bypass driver includes a pin shaped to engage the bypass finger and pivot the bypass lever against the bias of the bypass spring to engage the latch pawl and prohibit the projection of the latch pawl from engaging the second notch when the side rail is raised.

20. The patient support apparatus of claim 16, wherein the manual release is pivotally coupled to the side rail about a third pivot axis substantially parallel to the second pivot axis; and wherein the bypass lever is pivotally coupled to the side rail about a fourth pivot axis substantially parallel with the third pivot axis.

* * * * *